United States Patent
Kamei et al.

(10) Patent No.: US 8,562,171 B2
(45) Date of Patent: Oct. 22, 2013

(54) LED LINEAR LIGHT SOURCE AND READING APPARATUS

(75) Inventors: Koichi Kamei, Hyogo (JP); Minoru Shigoku, Hyogo (JP); Yoshihisa Yokokawa, Hyogo (JP); Yoshihiro Kanahashi, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 139 days.

(21) Appl. No.: 12/929,068

(22) Filed: Dec. 28, 2010

(65) Prior Publication Data
US 2011/0164412 A1    Jul. 7, 2011

(30) Foreign Application Priority Data

Dec. 28, 2009 (JP) .................................. 2009-296736
Sep. 29, 2010 (JP) .................................. 2010-218223

(51) Int. Cl.
*F21V 1/00* (2006.01)
*F21V 5/00* (2006.01)
*F21V 21/00* (2006.01)
*F21V 7/04* (2006.01)

(52) U.S. Cl.
USPC ...................................... 362/217.05; 362/551

(58) Field of Classification Search
USPC ............................................ 362/217.05, 551
See application file for complete search history.

(56) References Cited

U.S. PATENT DOCUMENTS

| | | | | |
|---|---|---|---|---|
| 4,989,122 A * | 1/1991 | Allekotte et al. | ............ | 362/97.1 |
| 5,258,896 A * | 11/1993 | Dreyer, Jr. | .................... | 362/307 |
| 6,123,430 A * | 9/2000 | Ono et al. | ..................... | 362/608 |
| 6,204,938 B1 * | 3/2001 | Horiuchi et al. | .............. | 358/484 |
| 6,351,594 B1 * | 2/2002 | Nakamura et al. | ............ | 385/146 |
| 6,783,254 B2 * | 8/2004 | Fujino et al. | .................. | 362/615 |
| 6,966,664 B2 * | 11/2005 | Wu | ................. | 362/610 |
| 7,102,705 B2 * | 9/2006 | Kim et al. | ....................... | 349/65 |
| 7,478,941 B2 * | 1/2009 | Wu et al. | ....................... | 362/612 |
| 7,954,988 B2 * | 6/2011 | Lee et al. | ...................... | 362/555 |
| 2006/0274551 A1 * | 12/2006 | Takada | ......................... | 362/611 |

FOREIGN PATENT DOCUMENTS

JP    11-134918 A    5/1999

\* cited by examiner

*Primary Examiner* — David J Makiya
(74) *Attorney, Agent, or Firm* — Rader, Fishman & Grauer PLLC

(57) ABSTRACT

An LED linear light source includes an approximately rod-shaped light guiding member, at an end portion of which an LED is provided. The light guiding member is in an approximately arc shape in a cross sectional view taken perpendicular to an optical axis. The light guiding member has an upper face including a light emission face for emitting light and a lower face including a reflective face, which are arranged in parallel. A diffusing member diffuses light provided on part of an outer circumferential face adjacent to a light entering end face of the light guiding member. A light absorption member is provided in an outside of the light guiding member near at an end portion thereof.

7 Claims, 12 Drawing Sheets

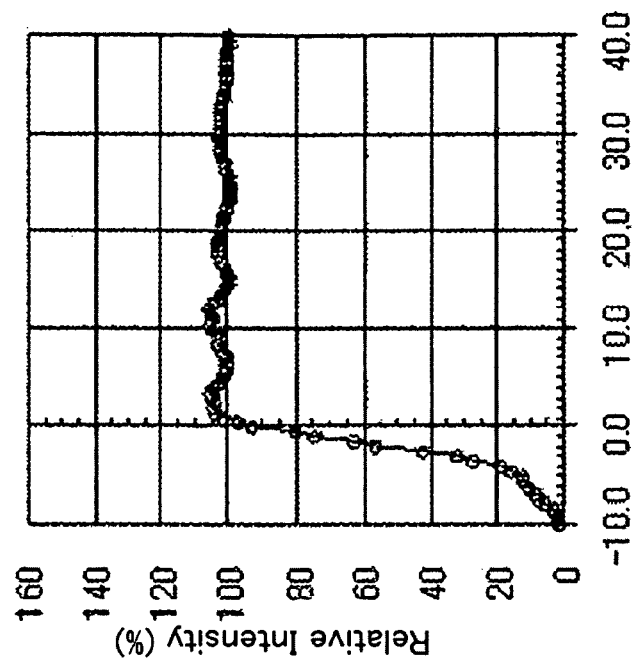
FIG.1D2
Enlarged view of a light entering surrounding part
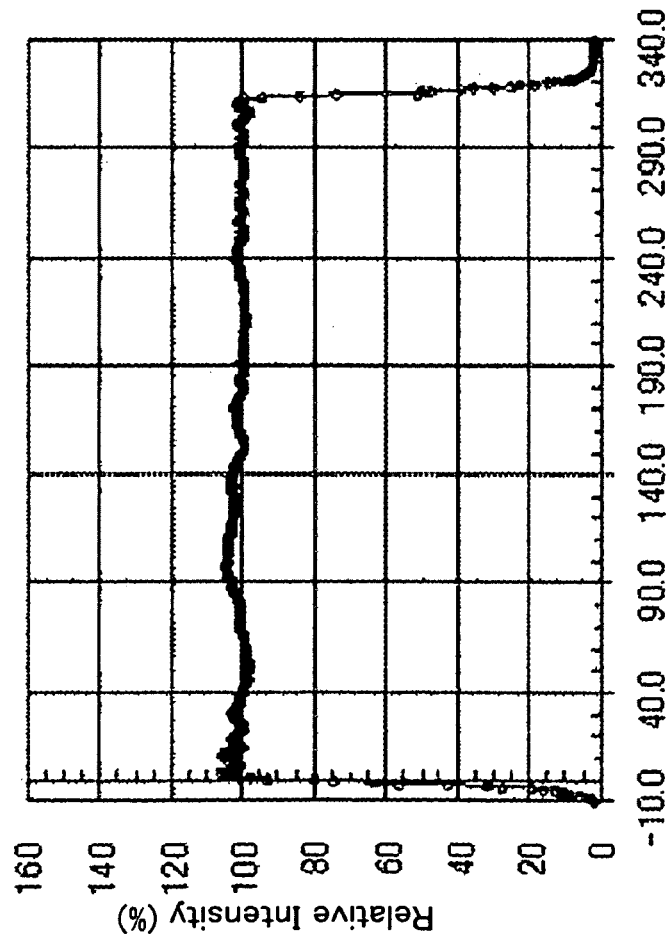
FIG.1D1
Measurement Result

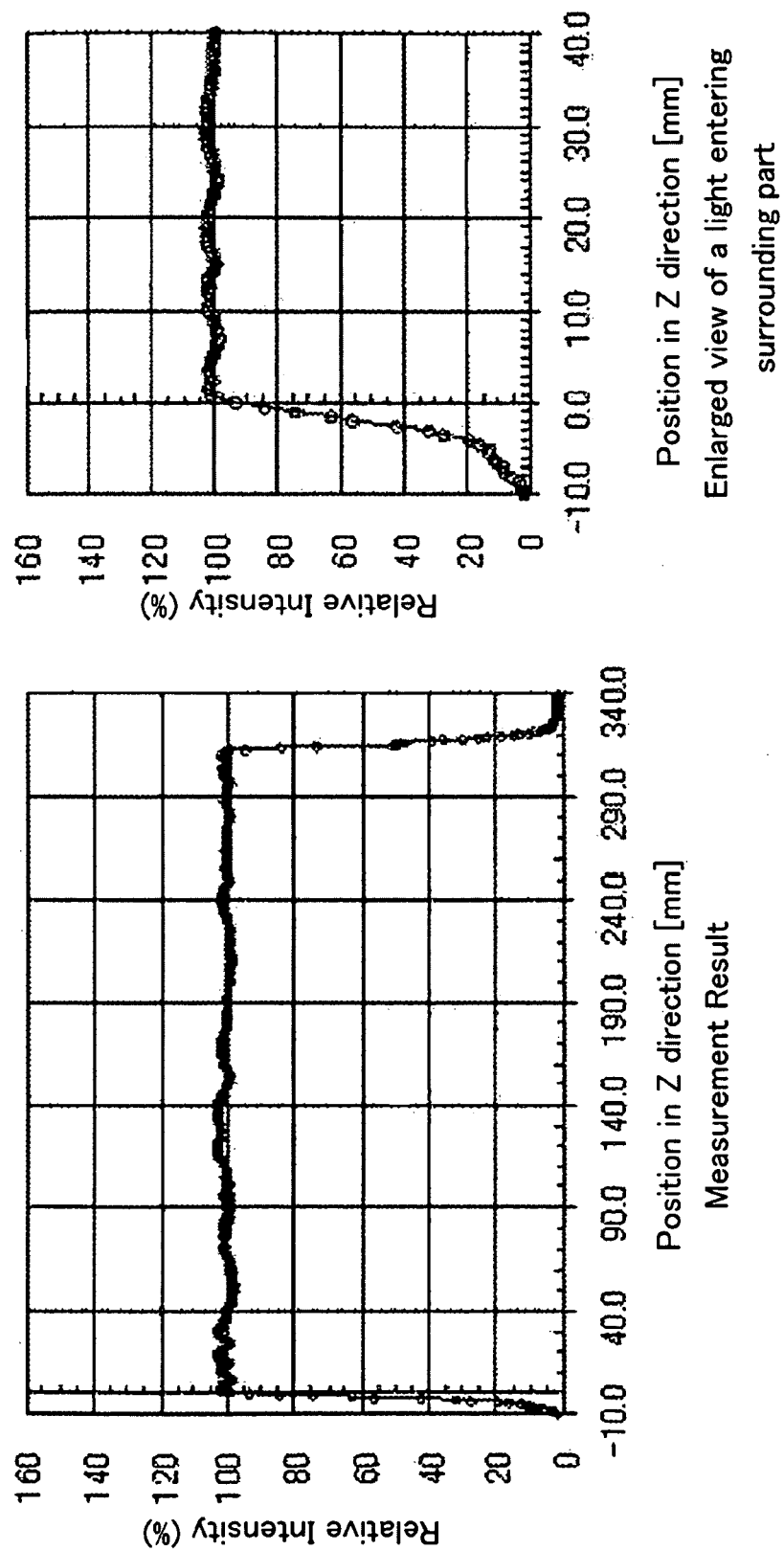
FIG.2B2
Enlarged view of a light entering surrounding part
FIG.2B1
Measurement Result

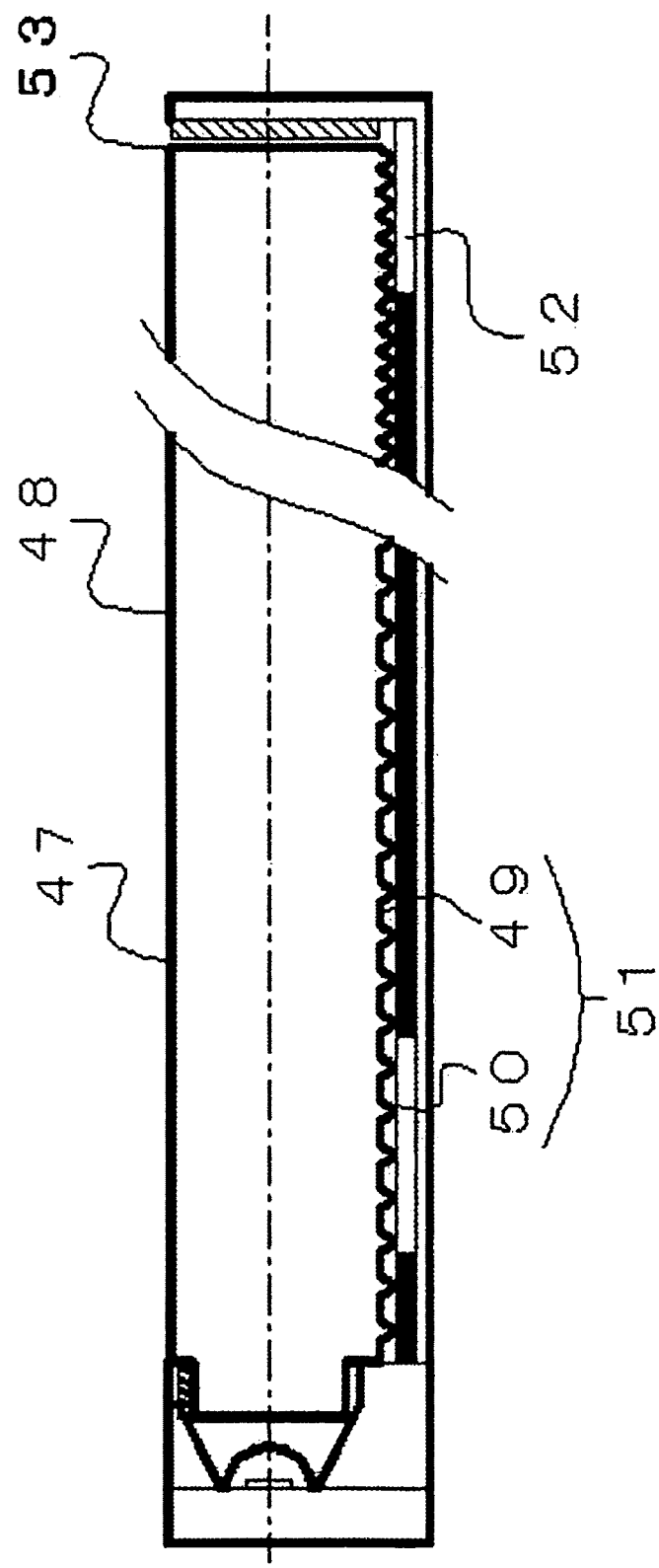

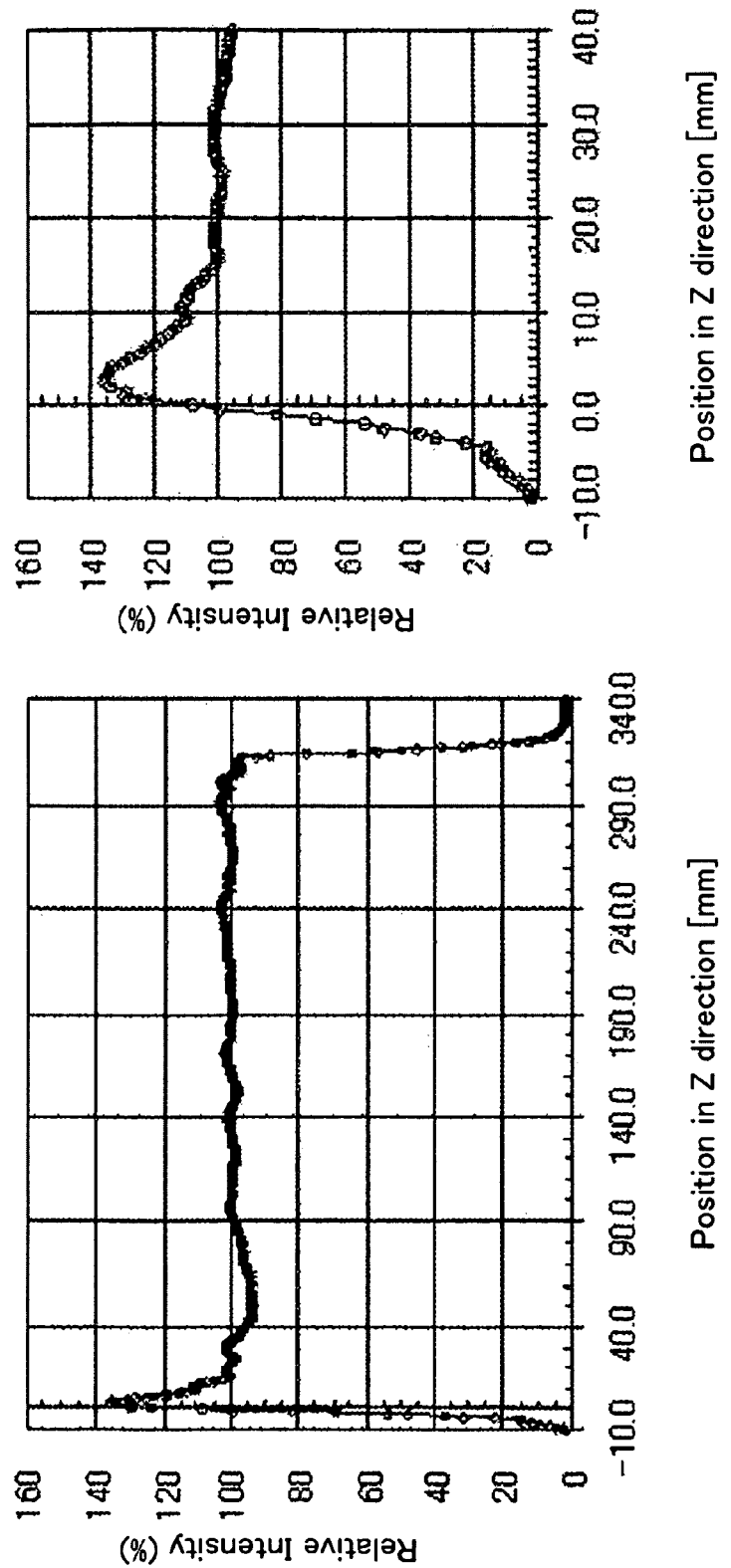
FIG.6D2 Background Art
Enlarged view of a light entering surrounding part
FIG.6D1 Background Art
Measurement Result

LED LINEAR LIGHT SOURCE AND READING APPARATUS

CROSS-REFERENCES TO RELATED APPLICATION

This application claims priority from Japanese Patent Application Serial No. 2009-296736 filed Dec. 28, 2009 and Japanese Patent Application Serial No. 2010-218223 filed Sep. 29, 2010, the contents of which are incorporated herein by reference in their entireties.

TECHNICAL FIELD

The present invention relates to an LED linear light source and a reading apparatus that are used for a document illuminating device. Especially, the present invention relates to an LED linear light source and a reading apparatus in which an LED is arranged at an end portion of a light guiding member.

BACKGROUND

Technology, in which a light emitting diode (LED) is used, is known as a light source for a document illuminating apparatus. This technology is divided into two types, an array type in which two or more LEDs are arranged over the entire document face in a width direction and a light guide member type in which an LED is arranged at an end portion of a light guiding member made of a transparent resin to propagate radiation light of the LED in the light guiding member. In recent years, the light guiding member type attracts attention, since an output of such an LED is becoming high.

For example, as disclosed in Japanese Patent Application Publication No. H11-134918, a linear light source using such a light guiding member is known. FIG. 7 shows a linear light source disclosed in the Japanese Patent Application Publication. An LED 71 is arranged at an end portion 73 of a light guiding member 72. Light emitted from the LED 71 enters the end portion 73 of the light guiding member 72, propagates inside the light guiding member 72, and emits from an outer face that extends in a longitudinal direction thereof. A reflective area 74, which is made up of triangular-waves shape face, is formed in the light guiding member 72, and a diffusion and reflection face 75 is provided so that the reflective area 74 may be covered. Moreover, the Japanese Patent Application Publication discloses the structure that has a space 76, which does not take optical matching between the reflective area 74 and the diffusion and reflection face 75.

Further, a connecting portion 77 is provided in an end face 733 of the light guiding member 72, and a diffusion layer 771 is formed on an outer circumference portion of the connecting portion 77. The connecting portion 77 is circular in a cross sectional view and the diameter is equal to or smaller than that of the light guiding member 72.

When a document is irradiated with light emitted from a linear light source, the technique disclosed in Japanese Patent Application Publication No. 11-134918 and set forth below is used to maintain the uniformity of the emitted light.

(a) A diffusion layer 771 is formed on an outer circumference of a cylindrical connecting portion 77, and the shape (diameter) of the light guiding member 72 is gradually made small from the light source.

(b) The width of the reflective area 74 is gradually made larger.

(c) The reflective area 74 with a constant width is intermittently arranged in a longitudinal direction.

However, in such a configuration, it is difficult to keep the irradiation light from an area adjacent to the light source uniform, for reasons set forth below.

The inventors made a light guiding member having the same structure as the above described example. FIG. 6A shows the structure of the light guiding member 72. FIGS. 6B and 6C show the structure of a document illuminating apparatus 85 in which the light guiding member 72 is arranged. FIGS. 6D1 and 6D2 show a intensity distribution on a document arrangement glass 86 (contact glass).

FIG. 6A shows a side view of the light guiding member 72, which is viewed from a light entering portion side. The light guiding member 72 is made of a transparent acrylic resin, and is 320 mm in full length. The light guiding member 72 has an approximately ellipse shape in a cross sectional view taken perpendicularly to an optical axis, which is a longitudinal direction of the light guiding member 72. The light guiding member 72 has an upper face 62 including a light emitting face 61, from which light is emitted, a side face 65 and a lower face 64 including a reflective face 63, which faces the upper face 62 and consists of concave portion 631 and convex portion 632. A diffusion and reflection face 67 is provided under the lower face 64 of the light guiding member 72 entirely through an air layer 66, which is formed between the lower face 64 of the light guiding members 72 and the diffusion and reflection face 67. Moreover, a cylindrical projection portion 68 is provided on a light entering end face of the light guiding member 72, and a coating 69 having optical diffusion and reflection nature is entirely applied to an outer circumference portion.

When an illuminating device using an LED linear light source is installed in a reading apparatus, such as a copying machine and a scanner, an illuminating apparatus is diagonally arranged with respect to a document reading area. This is because there is a structural restriction to capture light reflected from a document in CCDs, for example, in a contact exposure type apparatus, a Selfoc lens is arranged right under the document reading area, and in a reduction exposure type apparatus, a folding mirror is arranged thereunder.

As shown in FIG. 6B, the light source 72 is arranged in the left hand side of the figure with respect to a position (a position of a Y-axis shown as an imaginary line) on a document arrangement glass 86 (hereinafter simply referred to as a "glass"), at which radiation light is condensed. That is, a document face is irradiated with the radiation light of the light source 72 from an inclined direction.

FIG. 6C shows across sectional view taken along a line Y-Y of FIG. 6B. A reflector 723 is arranged on the other end face 722 of the light guiding member 72, so that light, which reaches the other end face 722, passing through the inside of the light guiding member 72 may be reflected by the reflector 723, to return the light to the light guiding member.

A light source 70 is made up of a light emitting diode 701 placed on a substrate, a semispherical sealing member 702, which seals an outer circumference, and a reflector 704, which has an approximately conically-shaped reflective face 703 provided so that the sealing member 702 may be surrounded.

A small rectangle component on the glass 86 of FIGS. 6B and 6C shows a light receiving element 88. The intensity distribution on the glass 86 can be measured by moving the light receiving element 88 arranged on the glass 86 in a Z direction.

FIG. 6D1 shows the intensity distribution that is obtained by measuring light emitted from the light guiding member 72 and condensed on the glass 86 by the light receiving element 88. The relative intensity (%) is on a vertical axis, wherein when the intensity value of light is measured at an intersection "a1" of an imaginary line "a" in a document side of the glass 86, a light intensity value at a center portion (Z=158 mm) of the light guiding member 72 in a longitudinal direction (Z axis direction) is taken as 100%. A measurement position (mm) in the Z axis direction is on an abscissa axis. Moreover, FIG. 6D2 is a partially enlarged view of that of a light entering circumference part.

Here, the imaginary line "a" is set as a Y axis, and the intersection "a1" of the imaginary line "a" in a side of a document is set to an original point (O) of an X axis (except the cylindrical projection portion on the light entering end face of the light guiding member 72), wherein the light receiving element 88 is moved in both directions of "+Z" (a right side direction in the figure) and "−Z" (a left side direction in the figure) from the original point on the glass 86, and the relative intensity (%) of light emitted to a side of the glass 86 was measured (black dot marks of this figure).

In the measurement result shown in the figure, the emitted light starts to gradually rise from a position of Z=−10 mm, and it reaches a peak at a position of Z=2.5 mm (135%). Moreover, uniformity is acquired, from a distance of 15 mm from the original point (except the cylindrical projection portion 68 from the end surface 73 of the light guiding member 72).

As described above, in the circumference part of the light source for the light guiding member 72, a light intensity distribution with the intensity peak of the emitted light is obtained, and to acquire uniformity in intensity of the emitted light, a certain distance from the light entering end surface of the light guiding member 72 is required. Therefore, in the structure disclosed in Japanese Patent Application Publication No. H11-134918, it is difficult to acquire the uniformity of irradiation light including that of circumference part of a light source, so that it is necessary to lengthen the full length of a light guiding member to acquire the uniformity, that is, it is necessary to lengthen a linear light source apparatus.

An intensity peak of output light in the circumference part of the light source for the light guiding member 72 can be explained as set forth below. That is, light, which is emitted from the light source 70 and enters the light guiding member 72, is guided through total internal reflection on a boundary face of the light guiding member 72. In such a case, the light may be classified in two groups, incident light (indirect incident light), which is indirectly incident on the reflective face 63 made up of the concave portions 631 and the convex portions 632, and incidence light (direct incident light), which is directly incident on the reflective face 63 made up of the concave portions 631 and the convex portions 632 without being reflected on the inside of the light guiding member 72.

Since the indirect incident light from all directions reaches a portion of the reflective face 63, which is away from the light source 70, part of the light is totally reflected by the reflective face 63 and emitted towards a light emitting face. In addition, some of light, which is refracted by the reflective face 63 and guided out of the light guiding member 72, enters the light guiding member 72 again, by the diffusion and reflection face 67 located behind the reflective face 63, to be guided inside the light guiding member 72 or to be outputted from the light emitting face, which forms an irradiation form that has a suitable spread on a document face.

However, in a circumference part of the light source 70, there are the direct incident light, which is emitted from the light emitting diode 701 and enters it directly, and the indirect incident light, which is reflected on the reflective face 63 after passing through approximately a few times of reflection on the boundary face of the light guiding member. Furthermore, there is light, which is refracted by the reflective face 63 and is guided outside the light guiding member 72, that enters the light guiding member again, to be guided inside the light guiding member by the diffusion and reflection face 67 located in a back side of the reflective face 63, and output light, which is outputted from the light emitting face by the diffusion and reflection face 67. As a result, the light emitted from the circumference part of the light source 70 has an intensity peak thinner and sharper, than that of light emitted from most part of the light guiding member 72, which emits uniform light on a document face.

Although the case, where the reflective face 63 made up of the concave portions 631 and the convex portions 632 is formed, is explained above, the same thing can be said even if coating material having light reflectivity is applied to the reflective face 63.

The output light having the thin and sharp intensity peak, makes intensity of light to be read, which is reflected from a document, notably fluctuate, depending on attachment accuracy of the linear light source, or rattling of a support board for the light guiding member at time of document scanning. Furthermore, there is a problem that light intensity also changes notably in the depth direction, for example, floating of a document or a foldout portion of a thick book.

For such a reason, since it is difficult to control the output light coming from a circumference of the light source, a light emission area where the output light becomes uniform after passing on the light having the thin and sharp intensity peak, is used as readable light emission area. Therefore, it is difficult to shorten the full length of such a light guiding member.

SUMMARY

It is an object of the present invention to obtain output light uniformity regarding light emitted from an end face of the LED linear light source, in which an LED is at an end face of the light guiding member and from a compact LED linear light source including said LED linear light source.

Thus, the present invention relates to an LED linear light source comprising an approximately rod-shaped light guiding member; an LED at an end portion the approximately rod-shaped light guiding member, wherein the approximately rod-shaped light guiding member is an approximately arc shape when taken in a cross sectional view perpendicular to an optical axis that is in a longitudinal direction of the approximately rod-shaped light guiding member, and wherein the approximately rod-shaped light guiding member has an upper face including a light emission face for emitting light and a lower face including a reflective face arranged in parallel to the upper face along the optical axis to face the upper face; a diffusing member for diffusing light provided on part of an outer circumferential face adjacent to a light entering end face of the approximately rod-shaped light guiding member; and a light absorption member provided outside of the approximately rod-shaped light guiding member and near an end portion of the approximately rod-shaped light guiding member.

Further, the diffusing member may be a coating that has light diffusibility.

Furthermore, the diffusing member may be made up of a portion of the approximately rod-shaped light guiding member to which concavo-convex processing is performed.

Further, the LED linear light source may further comprise a translucent diffusing member that changes a direction of the light rays, wherein the reflective face that guides light rays to the outside the approximately rod-shaped light guiding member, and wherein the reflective face has a concave and convex portion that faces the upper face of the approximately rod-shaped light guiding member.

Moreover, a reading apparatus may include the above described LED linear light source.

BRIEF DESCRIPTION OF THE DRAWINGS

Other features and advantages of the present LED linear light source and reading apparatus will be apparent from the ensuing description, taken in conjunction with the accompanying drawings, in which:

FIG. 1D1 shows an intensity distribution of light on a contact glass;

FIG. 1D2 is an enlarged view at a circumference part of the light entering portion;

FIG. 2B1 shows a measurement result;

FIG. 2B2 shows an enlarged view at a circumference part of a light entering end face side;

FIG. 5 is a schematic view of the structure of still another example of an LED linear light source according to the present invention;

FIG. 6D1 shows an intensity distribution of light on a contact glass in background art;

FIG. 6D2 is an enlarged view at a circumference part of the light entering portion in background art.

DESCRIPTION

Figure 1A:
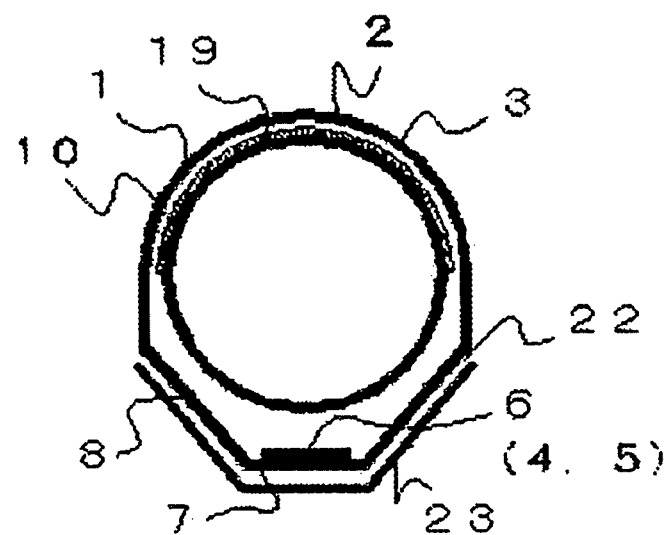
FIG. 1A shows a side elevational view of a light guiding member according to a first embodiment of the present invention.

In an LED linear light source according to the present invention and its embodiments, a very compact linear light source may be manufactured where the output light uniformity including light emitted from a circumference of the end portion is acquired and the full length of the light guiding member is used as the effective light emission length.

Accordingly, it becomes possible to increase indirect incident light, which is incident on the reflective face near the light entering portion, within the light guiding member, by diffusing the incident light in part of an outer circumferential face adjacent to the light entering end face (an end face where light emitted from an LED enters) of the light guiding member.

Further, it becomes possible to reduce uneven intensity portions by absorbing part of light, which is refracted by the reflective face formed to face an upper face of the light guiding member and which is guided outside the light guiding member, by an absorption member provided outside the light guiding member.

Furthermore, when the coating having light reflectivity is applied to the side of the light emission face of the outer circumferential face adjacent to the light entering end face of the light guiding member, among light rays that enter the inside of the light guiding member, light which reaches the outer circumferential face in the side of the light emission face, is diffused and reflected in a direction of the reflective face adjacent to the light entering end face of the light guiding member, so that it becomes possible to further increase the indirect incident light which enters the reflective face. Since it becomes possible to emit light from the position near the light entering end portion of the light guiding member, the intensity of light emitted from the end portion is increased, so that the full length of the light guiding member can be shorten to be close to the effective light emission length.

Further, concavo-convex processing may be performed to the side of the light emitting face of the outer circumferential face that is adjacent to the light entering end face of the light guiding member, so that the light, which reaches the outer circumferential face of the side of the light emitting face, is diffused and reflected or diffused and passed therethrough. Light, which is diffused and reflected, propagates towards a side of the reflective face near the light entering end face of the light guiding member, and turns into indirect incident light that is incident on the reflective face.

Moreover, the light, which is diffused and passes therethrough, is reflected to re-enter the light guiding member, by a light emitting diode, a semispherical sealing member for sealing an outer circumference, and a reflector, which an approximately conically-shaped reflective face provided to surround the sealing member. In that process, the light is diffused again, and goes towards the reflective face near the light entering end face of the light guiding member, and turns into indirect incident light that is incident on the reflective face. Therefore, it becomes possible emit light from the position near the light entering end portion of the light guiding member. Since it becomes possible to emit light from the position near the light entering end portion of the light guiding member, the intensity of light emitted from the end portion is increased, so that the full length of the light guiding member can be made short to be close to the effective light emission length (the light guiding member can be made compact).

Further, since light rays, which are refracted and guided outside the light guiding member from the reflective face formed to face the upper face of the light guiding member, is guided outside the light guiding member, is transmitted and diffused by a translucent diffusing member that changes a direction of the light guided outside the light guiding member and is reflected by a diffusion and reflection member located in a back side thereof to pass through the translucent diffusing member again, it becomes possible to further increase a diffusion component and to reduce local light/darkness of intensity distribution.

Moreover, when the above-mentioned LED linear light source is arranged, uniform light is emitted from the light guiding member, so that while an accurate copy with good reproducibility can be realized, it is also possible to make the reading apparatus itself compact.

Thus, an LED linear light source according to the present invention comprises an approximately rod-shaped light guiding member, which has an upper face including a light emitting face, and a lower face including a reflective face which faces the upper face. A diffusing member is formed on part of an outer circumferential face that is adjacent to a light entering end face (end face, from which light emitted from LED enters) of the light guiding member. Furthermore, the reflective face of the light guiding member totally reflects part of light toward the light emission face, while the other part of the light is refracted on the reflective face to come out of the light guiding member. The light, which comes out of the light guiding member, is absorbed by a light absorption member. Consequently, the light, which enters the light guiding member, is diffused by the diffusing member, thereby increasing indirect light, which is incident on the reflective face near the light entering portion. Thus, it becomes possible to emit light from the light emission face near the light entering end face of the light guiding member, to reduce an uneven intensity region by the light absorption member, and to offer a very compact linear light source that has improved light uniformity since the full length of the light guiding member is used as the effective light emission length.

Embodiment 1

Figure 1B:
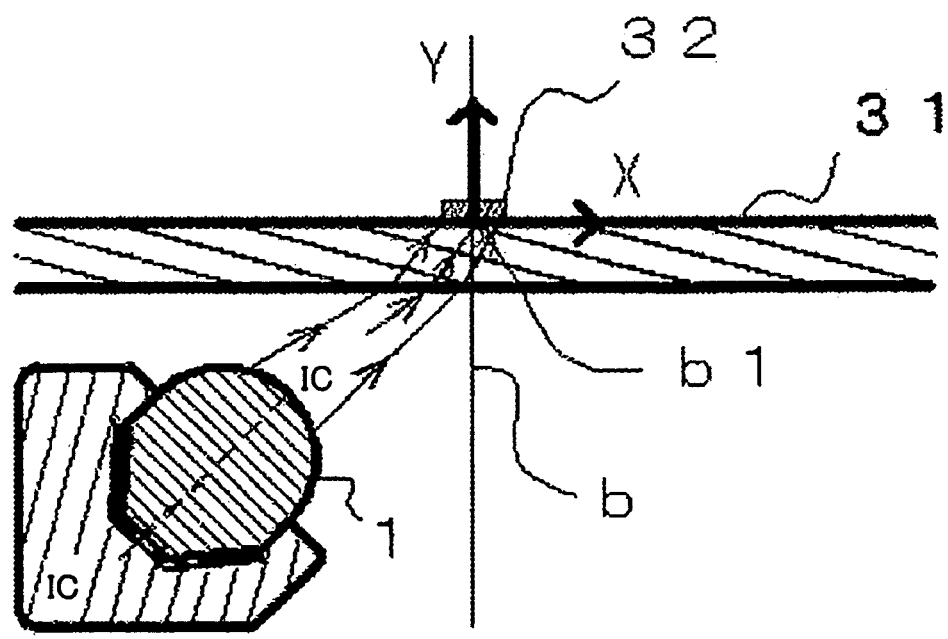
FIG. 1B is a measurement layout drawing including a light receiving element.
Figure 1C:
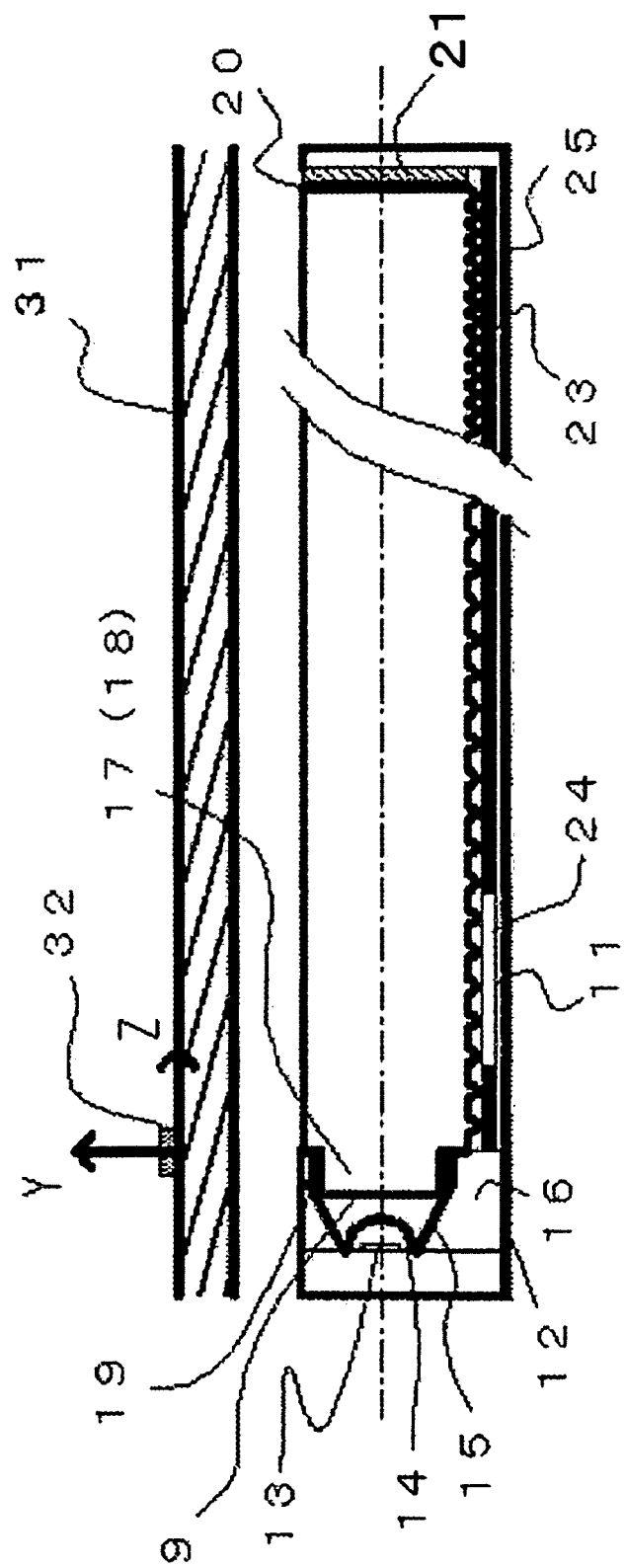
FIG. 1C is a cross sectional view taken along a line IC-IC of FIG. 1B.

Referring to FIGS. 1A, 1B, 1C, 1D1 and 1D2, an LED linear light source according to a first embodiment of the present invention will be described. A light guiding member 1 is made of transparent acrylic resin and has a length of 320 mm. FIG. 1A is a side elevational view of the light guiding member, which is viewed from a side of a light entering portion 10 of the light guiding member formed perpendicularly to an light axis direction. FIG. 1B is a measurement layout drawing including a light receiving element 32. FIG. 1C shows a cross sectional view taken along a line IC-IC of FIG. 1B. The light guiding member 1 includes an upper face 3 including a light emission face 2, a lower face 7 arranged so as to face the upper face 3, and a side face 8 that connects the upper face 3 and the lower face 7. The reflective face 6, which consists of concave portions 4 and convex sections 5, is formed on the lower face 7.

A light source 12 comprises a light emitting diode 13 placed on a substrate, a semispherical sealing member 14 for sealing an outer circumference, and a reflection mirror 16, which has a conical reflective face 15 to surround the sealing portion 14. Moreover, a projection portion 17 is formed on an end face of the light guiding member 1, which light emitted from the light source 12 enters. The projection portion 17 has a cylinder shape with a diameter of 5 mm and a length of 2 mm. A coating 19 (diffusing member), which has light diffusibility properties, is applied to only a light emission face side of the outer circumferential face 18 of the cylindrical projection portion 17. The coating 19 is a mixture of titanium dioxide with a transparent silicone resin. An end diffusion and reflection member 21 is arranged on an other end face 20 of the light guiding member 1. The light that reaches the other end face 20 by passing through the inside of the light guiding member 1 is diffused and reflected by the end diffusion and reflection member 21, and is returned to the light guiding member 1 again.

A diffusion and reflection member 23 is arranged under the lower face 7 and the side face 8 through the light guiding member 1 and an air layer 22. Moreover, a cut out portion 24 is formed at a little distance away from the light entering face, for example, 6 mm to 14 mm therefrom, so that the diffusion and reflection member 23 is not formed there. When light, which enters the light guiding member 1, reaches the cut out portion 24, the light is absorbed by a support substrate 25, without diffusion and reflection. The diffusion and reflection member 23 is made from a white diffusion sheet. Specifically, the white diffusion sheet is made of polyethylene terephthalate (PET) resin, which is mixed with microscopic particles of titanium dioxide (for example, LUMIRROR E6QD, manufactured by TORAY INDUSTRIES, INC.). Moreover, the light guiding member 1 and the diffusion and reflection member 23 are fixed to each other by the support substrate 25. The support substrate 25 may be manufactured by arranging a black sheet in the cut out portion 24 or by black resin or aluminium to which black alumite processing is performed.

In FIG. 1C, a light receiving element 32 is shown as a small rectangular member on a glass 31. As to the light emitted from the light guiding member 1, when the light receiving element 32 provided on the glass 31 is moved in a direction Z, an intensity distribution of light on the glass 31 can be measured.

FIG. 1D shows the light intensity distribution on the glass 31. The relative intensity (%) is on a vertical axis, When a light intensity value in the document side of the glass 31 and at the intersection "b1" of the imaginary line "b" is measured, the light intensity value at the center portion (at a distance Z=158 mm when the position of a light source 12 side of the light guiding member 1 excluding the cylindrical projection portion 17 is set to 0 mm) in a longitudinal direction (Z direction) of the light guiding member 1 is taken as 100%. Moreover, a measurement position (mm) on the glass 31 in a Z axial direction is on an abscissa axis in the figure. Here, the light receiving element 32 is moved in both directions of "+Z" (a right side direction in the figure) and "−Z" (a left side direction in the figure) from the original point on the glass 31, and the relative intensity (%) of light on the glass 31 is measured (black dot marks of this figure). In addition, the imaginary line "b" is set as a Y axis, and an intersection "b1" of the imaginary line "b" and a side of a document on the glass 31 is set to an original point (O) when the cylindrical projection portion 17 is excluded from a light entering face 9 side of the light guiding member 1.

FIGS. 1D1 and 1D2 show a measurement result. FIG. 1D2 is an enlarged view at the light entering portion. In the measurement result, it turns out that the output light starts to gradually rise from a position of Z=−10 mm, and the relative intensity reaches 105% at a position of Z=1 mm (135%). This shows that the output light emitted to the document side, which includes light emitted from the surrounding of the light source 12, has high uniformity.

Thus, such a diffusing member is formed on the outer circumferential face 18 of the projection portion of the light guiding member 1, and the light that reaches the light emission face is diffused and reflected, thereby increasing the indirect incident light towards the reflective face 6. For this reason, uniform light can be emitted from the position near the light entering end face 9 of the light guiding member 1. Furthermore, part of light, which is refracted and guided out of the light guiding member 1 by the reflective face 6, which is formed to face the upper face 3 of the light guiding member 1, is absorbed by the light absorption member 11 provided on the outside of the light guiding member 1. Therefore, it becomes possible to reduce an uneven intensity portion, whereby the uniformity of the output light, including light which is emitted from the surrounding area of the light source 12 for the light guiding member 1, is acquired. In addition, it is possible to offer a very compact linear light source, since the full length of the light guiding member is used as the effective light emission length.

Embodiment 2

FIG. 2 shows an LED linear light source according to a second embodiment of the present invention. The second embodiment is different from the first embodiment, in that a translucent diffusion sheet 37 is sandwiched between a lower face 34 of a light guiding member 33 and a side face 35, and a diffusion and reflection member 36. As the translucent diffusion sheet 37, for example, 25MBC, manufactured by KIMOTO, CO LTD. may be used.

Figure 2A:
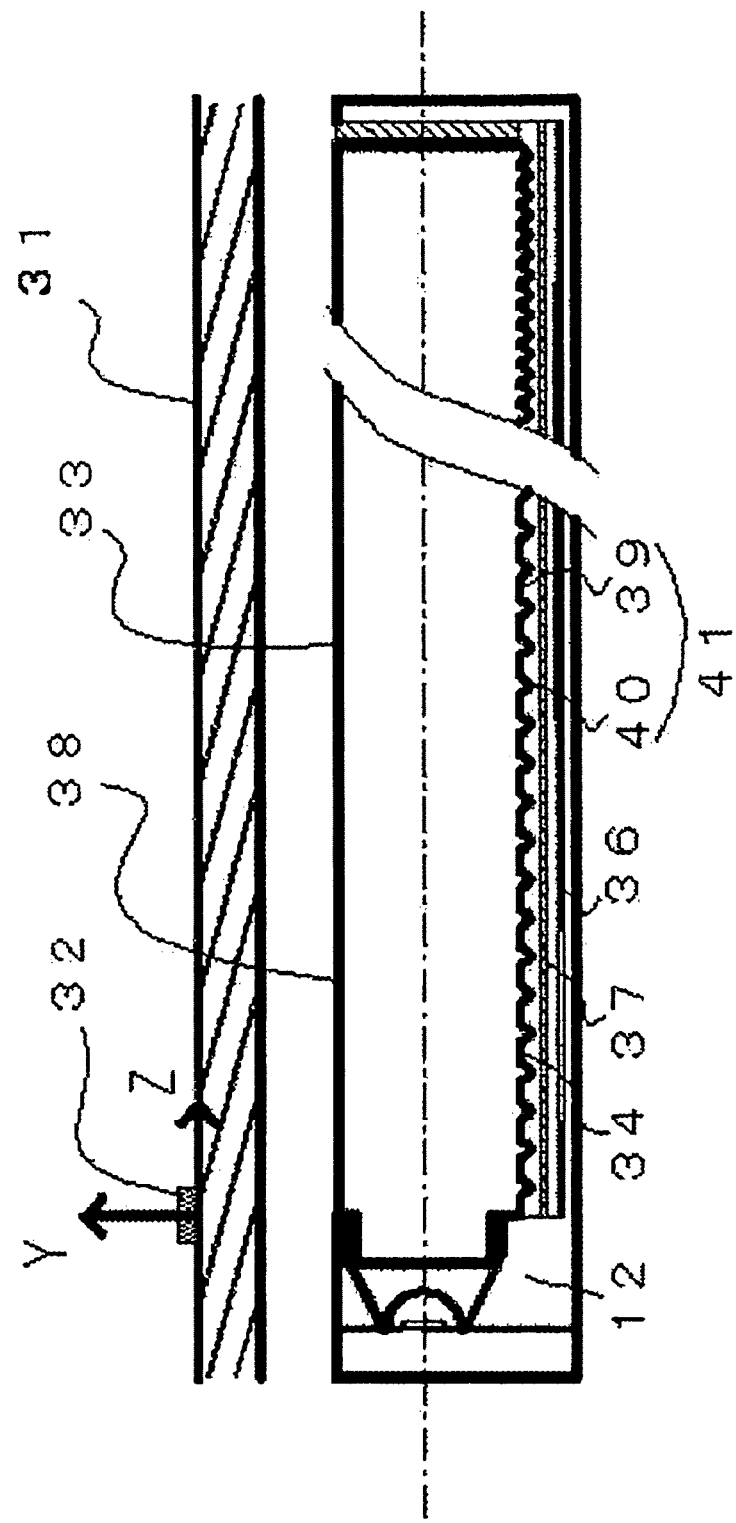
FIG. 2A shows the structure of an LED linear light source according to a second embodiment of the present invention.

In FIG. 2A, the light receiving element 32 is shown as a small rectangular member on a glass 31. When the light receiving element 32 is moved in a direction Z, an intensity distribution on the glass 31 is measured.

FIG. 2B shows an intensity distribution on the glass 31. In the figure, the relative intensity of light is on a vertical axis. Specifically, the figure shows the relative intensity (%) when a light intensity value in the document side of the glass 31 and at a position corresponding to the intersection "b1" of the imaginary line "b" in an arrangement similar to that shown in FIG. 1B is measured and when the light intensity value at the center portion (at the same position as that of FIG. 1B) in a longitudinal direction (Z direction) of the light guiding member 33 is taken as 100%. Moreover, a measurement position (mm) in a Z axial direction on the glass 31 is on an abscissa axis in the figure.

Similarly to FIG. 1B, the imaginary line "b" is set as a Y axis, and an intersection b1 of the imaginary line "b" and a document side of the glass 31, is set to an original point (O) when the cylindrical projection portion 17 is excluded from a light entering face 9 side of the light guiding member 1. The light receiving element 32 is moved in both directions of "+Z" (a right side direction in the figure) and "−Z" (a left side direction in the figure) from the original point on the glass 31, and the relative intensity (%) of light emitted on a side of the glass 31 was measured (black dot marks of this figure).

FIGS. 2B1 and 2B2 show a measurement result, and specifically, FIG. 2B2 shows an enlarged view at a circumference of the light entering end face 9 side. In the measurement result, it turns out that the output light starts to gradually rise from a position of Z=−10 mm, and the relative intensity reaches 101% at a position of Z=1 mm. Thus, it turns out that uniformity of the output light, which includes light emitted from the surrounding of the light source 12, is further improved.

Thus, a translucent diffusing member is provided to change the direction of at least some of the rays of the light rays that are guided to the outside the light guiding member 33 from the reflective face 41, which includes concave portions 40 and convex sections 39 and which is formed to face an upper face 38 of the light guiding member 33. And the translucent diffusion sheet 37 transmits and diffuses the light, and then the light is reflected by the diffusion and reflection member 36 located in a back side thereof, so that the light passes through the translucent diffusion sheet 37 again. Furthermore, it becomes possible to increase a diffusion component so that it becomes possible to reduce local light/darkness of intensity distribution. Consequently, similarly to the first embodiment, while the further uniformity of the output light including light, which is emitted from surrounding of the light source 12 of the light guiding member 33, is acquired, it is possible to offer a very compact linear light source, since the full length of the light guiding member is used as the effective light emission length.

Figure 3A:
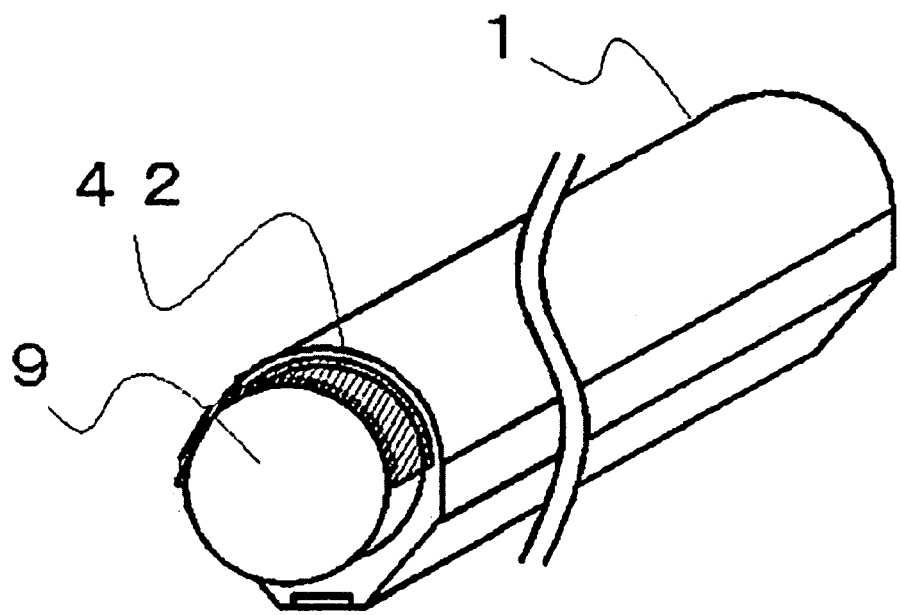
FIGS. 3A and 3B respectively show a diffusing member according to an embodiment of the present invention.
Figure 3B:
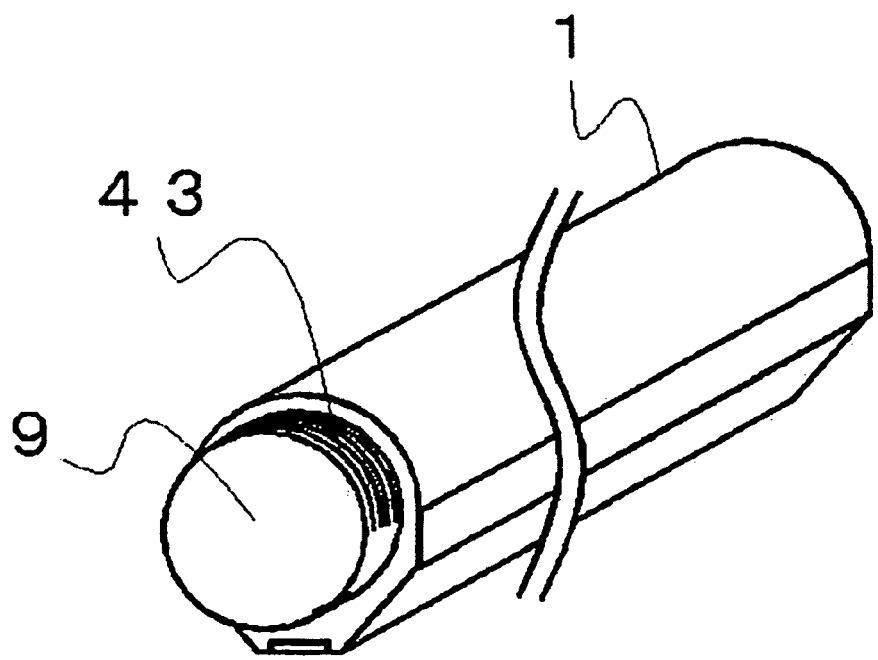

FIGS. 3A and 3B respectively show a diffusing member according to an embodiment of the present invention. As shown in FIG. 3A, a coating 42 with light diffusibility properties is formed on an outer circumferential face 18 of a projection portion. FIG. 3A also shows a case where a tape-like sheet, to which a coating with light diffusibility coating 42 is applied, may be attached thereto. The light diffusibility material may be a mixture of microscopic particles of, for example, titanium dioxide, barium sulfate, silica, and alumina and transparent silicone resin. FIG. 3B shows a case where concavo-convex processing is performed on a side (diffusing member 43) of the light emission face in the outer circumferential face 18 of the projection portion of the light guiding member 1. A portion 43, on which the concavo-convex processing is performed, may be formed by a laser, frosting processing, or by performing concavo-convex processing to a metallic mold at time of injection molding of the light guiding member 1, and then manufacturing by integral molding. As shown in FIG. 3A or FIG. 3B, it is possible to increase the light that reaches the reflective face arranged to face the upper face of the light guiding member 1 adjacent to the light source 12, by applying or forming it to the outer circumferential face 18 of the projection portion.

Figure 4:
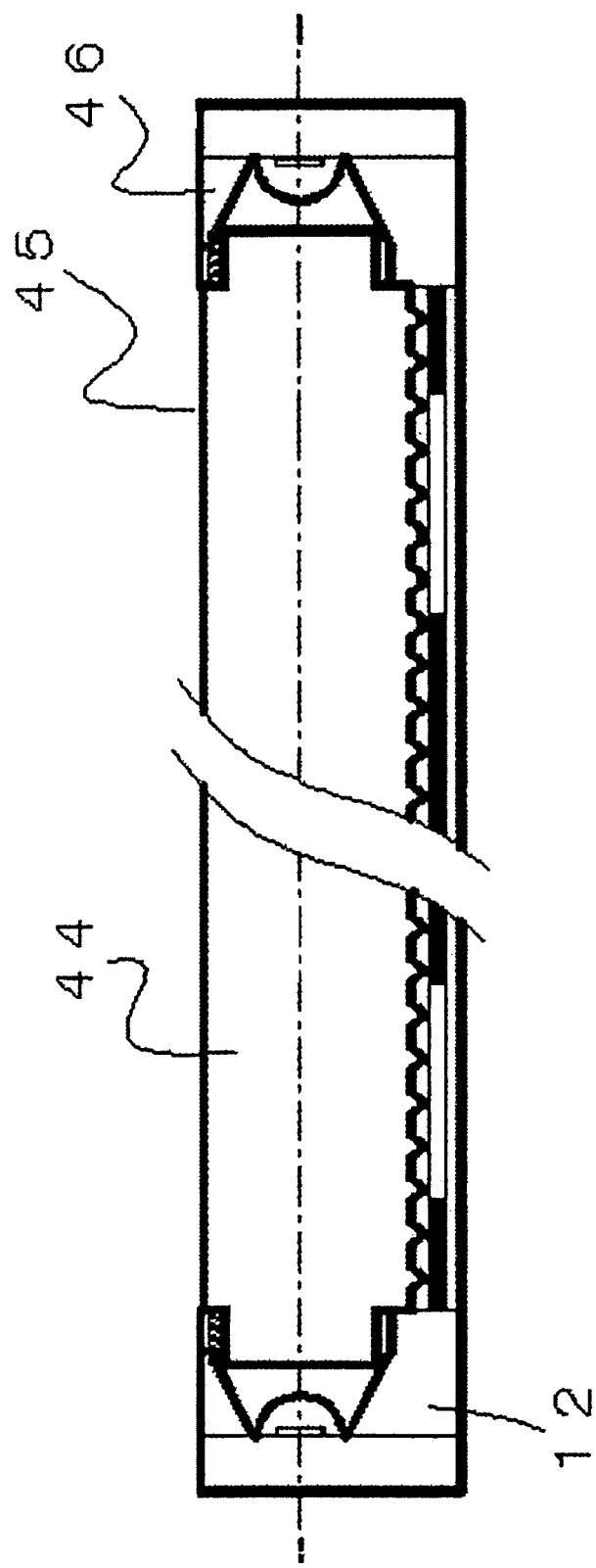
FIG. 4 is a schematic view of the structure of another LED linear light source according to the present invention.
Figure 6A:
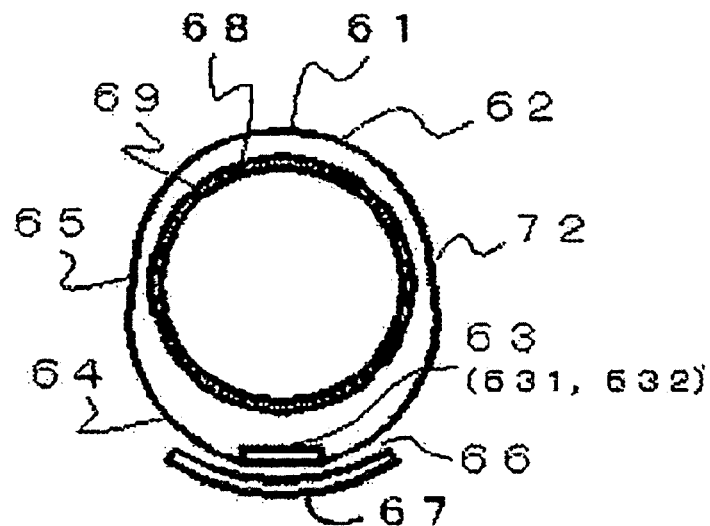
FIG. 6A is a side view of a light guiding member of background art.
Figure 6B:
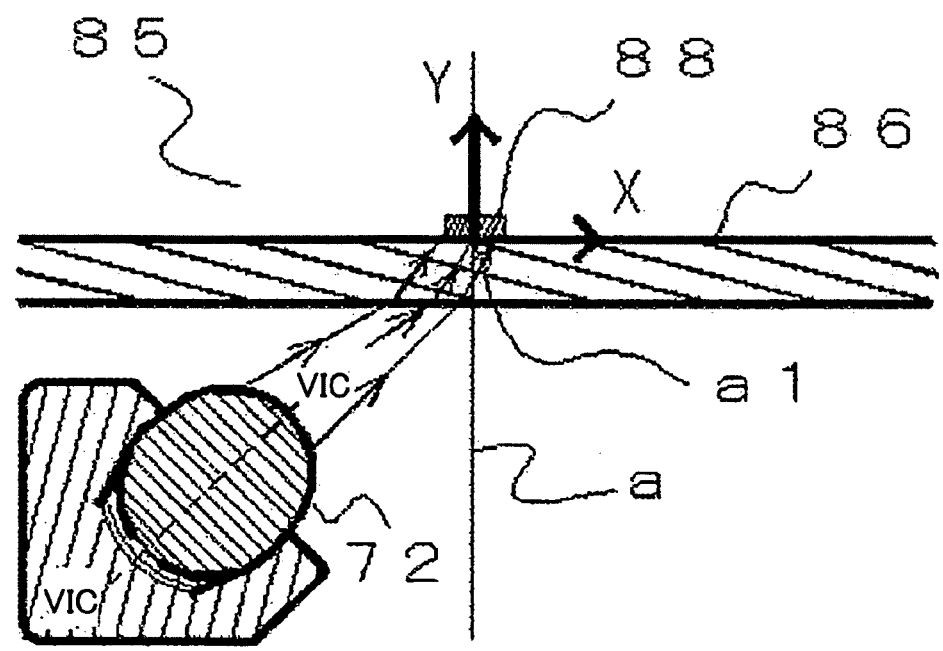
FIG. 6B is a measurement layout drawing including a light receiving element of background art.
Figure 6C:
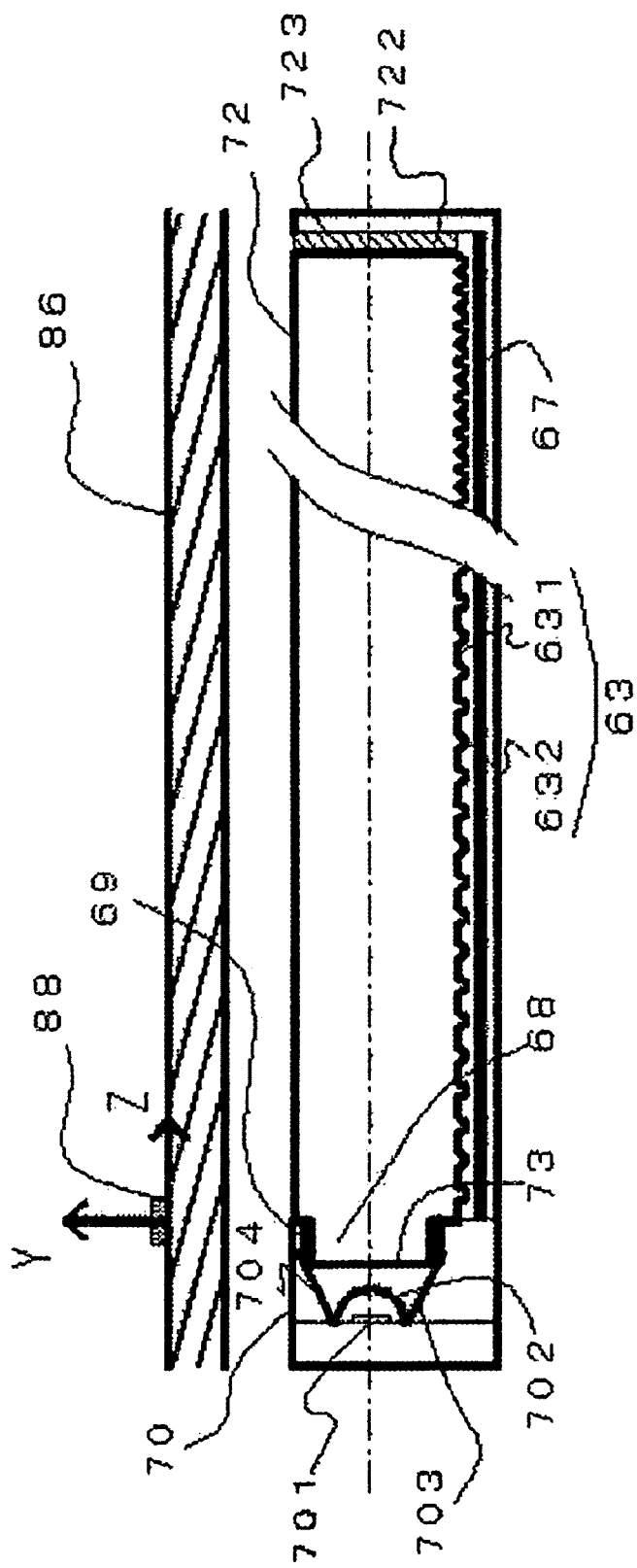
FIG. 6C is a cross sectional view of the structure of an LED linear light source of background art, taken along a line VIC-VIC of FIG. 6B.
Figure 7:
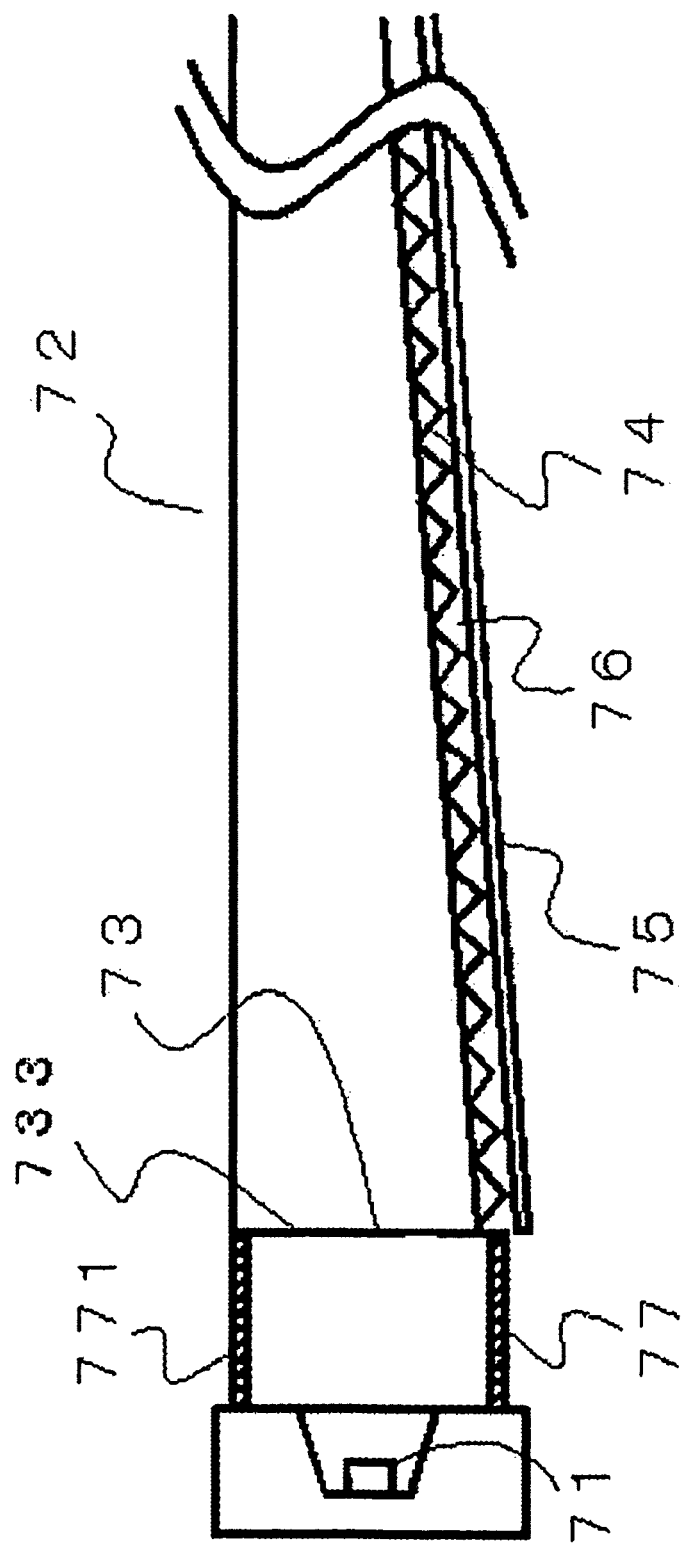
FIG. 7 is a schematic view of an LED linear light source of background art.

Moreover, in the first and second embodiments, when the intensity of light from the light source 12, which is provided at one end face of the light guiding member, is not sufficient, for example, as shown in FIG. 4, a light source 46 can also be provided at the other end face 45 of a light guiding member 44.

Moreover, as shown in FIG. 5, in the intensity distribution of radiation light from a light emission face of a light guiding member 47, when there is an uneven intensity region in a portion other than a portion near the light entering end face, for example, the light intensity is high around the other end face 53 of the light guiding member 47, an absorption member 52 can be provided at that position. The light guiding member 47 includes an upper face 48 and a reflective face 51 that has concave portions 50 and convex sections 49.

The preceding description has been presented only to illustrate and describe exemplary embodiments of the present LED linear light source and reading apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. An LED linear light source comprising:
   a light guiding member;
   an LED at an end portion the light guiding member,
   wherein the light guiding member is an approximately arc shape when taken in a cross sectional view perpendicular to an optical axis that is in a longitudinal direction of the light guiding member, and
   wherein the light guiding member has an upper face including a light emission face for emitting light and a lower face including a reflective face arranged in parallel to the upper face along the optical axis to face the upper face;
   a diffusing member that diffuses light provided on only a light emission face side of an outer circumferential face adjacent to a light entering end face of the light guiding member;
   a diffusion and reflection member is arranged under the light guiding member, the diffusion and reflection member having a cut out portion formed thereinto; and
   a light absorption member provided outside of the light guiding member and near an end portion of the light guiding member, the light absorption member facing the cut out portion thereby inhibiting the diffusion and reflection member from diffusing and reflecting light where the cut out portion and the light absorption member are located.

2. The LED linear light source according to claim 1, wherein the diffusing member is a coating that has light diffusibility.

3. The LED linear light source according to claim 1, wherein the diffusing member is made up of a portion of the light guiding member to which concavo-convex processing is performed.

4. The LED linear light source according to claim 1, further comprising:
    a translucent diffusing member that changes a direction of the light rays,
    wherein the reflective face that guides light rays to the outside the light guiding member, and
    wherein the reflective face has a concave and convex portion that faces the upper face of the light guiding member.

5. The LED linear light source according to claim 1, wherein the light guiding member is an approximately rod-shaped light guiding member.

6. A reading apparatus comprising the LED linear light source according to claim 1.

7. The LED linear light source according to claim 1, wherein the cut out portion formed into the diffusion and reflection member commences in a range of approximately 6 mm and 14 mm from the light entering end face and extends away therefrom.

* * * * *